Nov. 29, 1960   W. C. JONES   2,962,403
STRUCTURAL PANEL
Filed April 30, 1956
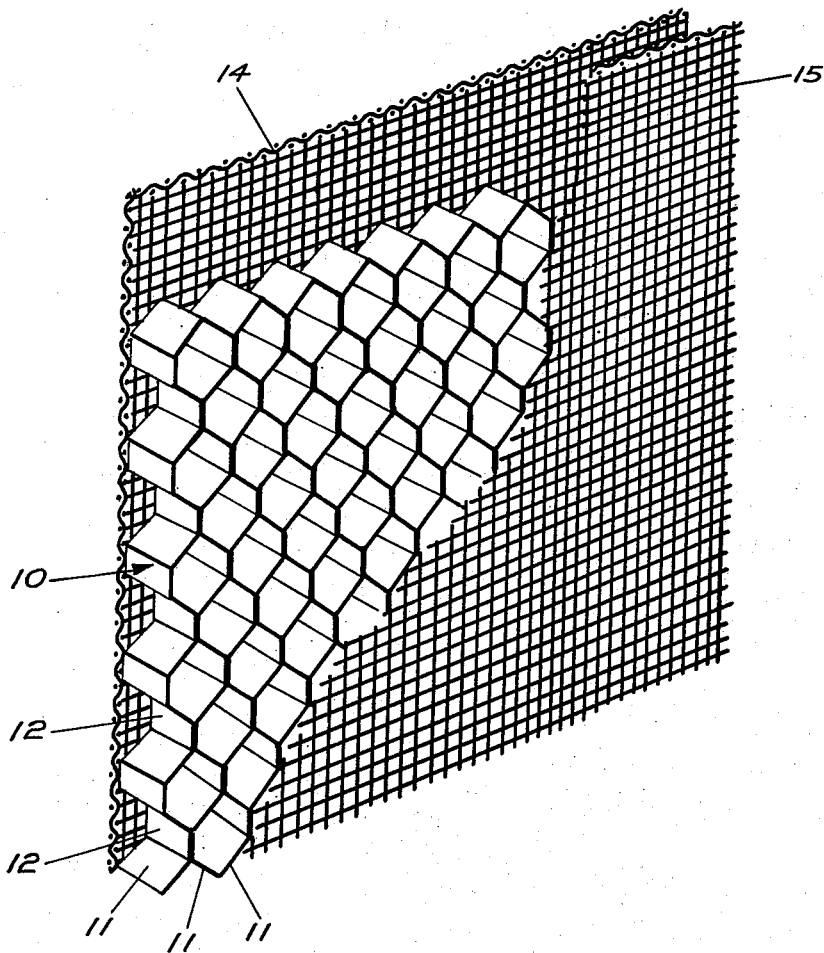
INVENTOR:
WARREN C. JONES.
BY:
Beau, Brooks, Buckley + Beau.
ATTORNEYS.

United States Patent Office 2,962,403
Patented Nov. 29, 1960

2,962,403
STRUCTURAL PANEL

Warren C. Jones, Fort Worth, Tex., assignor, by mesne assignments, to Bell Aerospace Corporation, Wheatfield, N.Y., a corporation of Delaware Filed Apr. 30, 1956, Ser. No. 581,757

2 Claims. (Cl. 154—45.9)

This invention relates to laminated panel structures and more particularly to a self-sustaining, light weight panel which is freely pervious to the passage of air and which transmits a considerable percentage of impinging light while at the same time being, in a general way, only semi-transparent.

The present invention provides a novel panel structure of general application which possesses attributes which may be availed of in various kinds of decorative, non-load-bearing partitioning, for self-sustaining display panels, for insect screening panels, and for any use where a panel is desired which is freely pervious to the passage of air and, to a lesser degree, of light, but which is only semi-transparent and thus affords privacy or a moderate degree of concealment for various purposes. The panel of the present invention is of particular usefulness in applications where extremely light weight is important.

The panel of the present invention may be employed as a room partition where a moderate degree of concealment is desirable but where free passage of air through the partition is employed. It may be usefully and advantageously employed as a guard or closure panel for machinery, engines, and the like, or for radio, television or other electrical equipment.

In the form of the present invention disclosed herein by way of example the laminated panel structure comprises a central core made up of metal foil in ribbon form in a honeycomb arrangement, with outer adhesively secured layers at opposite sides comprising ordinary woven wire metal screening such as is commonly employed for insect-repelling screens.

Both the honeycomb structure and the woven wire facings are preferably of non-corrosive metals which are stable and permanent and which are of pleasing appearance without extraneous surface decoration. The materials employed are freely available and of moderate cost and require no special preparation or fabrication excepting such as is involved in forming the honeycomb structure and laminating the surface sheet thereto.

The strands of conventional woven wire mesh screening extend in a rather flat zig-zag as a result of the interwoven condition, as is well known. This zig-zag extent does not appear to materially affect the flexibility of the screening considered by itself. Furthermore, the honeycomb structure of the panel of the present invention is of metal foil and consequently is quite flexible and non-self-sustaining when considered alone. However, when such screening is adhesively secured to the ends of the honeycomb formations of the core structure of the present invention the resultant panel has a stiffness which is unexpectedly high and which appears to be considerably more than the expected or merely cumulative stiffness of the laminations.

A single specific form of the panel structure of the present invention is illustrated fragmentarily in the drawing and described in detail in the following specification. It is to be understood that such embodiment is by way of example only and that various mechanical modifications may be made without departing from the spirit of the present invention, the scope of which is limited only as defined in the appended claims.

The single figure of the drawing is a perspective view of one form of the panel of the present invention, the same being illustrated fragmentarily on an enlarged scale and with portions thereof broken away for added illustration.

In the specific embodiment of the panel structure set forth herein the core structure is designated generally by the numeral 10 and is of honeycomb form. The honeycomb structure is formed, in the present instance, by employing a plurality of ribbons 11 of aluminum foil although other metallic foils or non-metallic foils may be employed.

Each foil ribbon extends generally vertically as viewed in the drawing and is of zig-zag form whereby adjacent ribbons abut as at 12 in the drawing, such abutting portions being adhesively secured, in the present instance, by any of the currently available metal-to-metal cements, the same being usually of a rubber base.

By way of setting forth a complete and fully detailed embodiment of the invention, although by way of example only, the honeycomb thickness, that is the thickness from one face of the panel to the other, is approximately three-sixteenths of an inch, and the width of the several cells is approximately one-quarter inch.

Woven wire screen of copper or brass is applied to both surfaces of the honeycomb structure 10 as at 14 and 15, such mesh being likewise secured by means of metal-to-metal cement. The screen facings 14 and 15, may be of other metals than those named above and may, if desired, be non-metallic in character. Again, merely by way of fully disclosing a complete embodiment of the invention, the wire mesh in the illustrated instance is of approximately fourteen meshes to the linear inch.

I claim:

1. A self-sustaining, light weight laminated panel consisting only of three laminations, each of which alone is incapable of being self-sustaining, the intermediate lamination being of honeycomb shape formed from a plurality of zig-zag foil ribbons disposed in side-by-side relation and joined in face-to-face contact intermittently along their lengths, the thickness of such ribbons being such that the honeycomb is freely flexible and incapable of exhibiting self-sustaining properties alone, the outer laminations on opposite sides of the honeycomb each being formed of woven wire screen joined rigidly to a corresponding side of the honeycomb so that the panel transmits a considerable percentage of impinging light while at the same time being only semi-transparent.

2. The invention as set forth in claim 1, wherein the thickness of the panel being in the order of $3/16$ of an inch, the width of the individual cells of the honeycomb being in the order of $1/4$ inch and the lineal spacing of the mesh of the screen laminations being in the order of $1/4$ the width of said cells so that the stiffness of the panel is considerably greater than the cumulative stiffness of the individual laminations.

References Cited in the file of this patent

UNITED STATES PATENTS

| | | |
|---|---|---|
| 1,972,592 | Jacobson | Sept. 4, 1934 |
| 2,056,563 | Budd et al. | Oct. 6, 1936 |
| 2,537,217 | Farr | Jan. 9, 1951 |
| 2,609,068 | Pajak | Sept. 2, 1952 |
| 2,639,248 | Overholt | May 19, 1953 |
| 2,722,735 | Beamish | Nov. 8, 1955 |
| 2,742,387 | Giuliani | Apr. 17, 1956 |
| 2,793,972 | Ganslein | May 28, 1957 |